Jan. 27, 1970 R. E. FREDRICK, JR 3,492,603

BROADBAND DOUBLY-BALANCED MIXER OR MODULATOR
INCLUDING HYBRID CIRCUITS
Filed Nov. 3, 1967

INVENTOR.
RAYMOND E. FREDRICK, JR.
BY
*Thomson & Mrose*
ATTORNEYS

United States Patent Office 3,492,603

Patented Jan. 27, 1970

3,492,603

BROADBAND DOUBLY-BALANCED MIXER OR MODULATOR INCLUDING HYBRID CIRCUITS

Raymond E. Fredrick, Jr., Rowayton, Conn., assignor to Adams-Russell Co., Inc., Waltham, Mass., a corporation of Massachusetts Filed Nov. 3, 1967, Ser. No. 680,568
Int. Cl. H03c *1/54*
U.S. Cl. 332—47 13 Claims

ABSTRACT OF THE DISCLOSURE

A ring-modulator type electrical mixer network exhibiting exceptionally broadband characteristics includes at least a pair of hybrids of transmission-line construction each coupled externally wholly through matching transmission-line sections of non-critical lengths, and limiting quarter-wave cut-off effects are precluded through characteristic-impedance loading.

BACKGROUND OF THE INVENTION

The present invention relates to improvements in multiport high frequency translation devices such as ring modulators, and, in one particular aspect, to novel and improved electrical mixer apparatus useful as a modulator, converter, or the like, wherein the upper frequency range is readily and advantageously extended beyond prior practical limits by way of transmission-line connections, and wherein both broadband and power-loss characteristics are promoted by unique terminations.

Requirements for the combinations and subdivisions of electrical signals in prescribed relationships have in the course of time resulted in families of special-purpose electronic hardware which are commercially available in unit form to serve these purposes for systems designers. Multiport hybrids and mixers are typical of this class of equipment, and have involved a variety of components and network designs. Although low-frequency versions of such equipment may be rather routinely caused to exhibit relatively low losses and stable electrical characteristics within a limited spectrum, comparable results have not been readily attainable in non-adjusted equipment intended to operate over broadbands extending to very high frequencies (example: above about 1,000 mc.). In particular, changes in reactance with frequency are responsible for serious difficulties which have not been avoidable unless circuit parameters are varied to achieve needed compensations; however, circuit adjustments are troublesome and cannot always be effected, and it is of obvious advantage in terms of versatility, utility and economy that broadband operating capabilities be inherent in a given network design. An important case in point is that of the so-called ring modulator type of mixer, wherein the high-frequency problems are especially vexing because unavoidable line lengths associated with connections to the diodes occasion quarter-wave cut-off phenomena which will disturb operation of or totally incapacitate the mixer. Accordingly, the present teachings are concerned with multiport signal-translating networks which utilize fixed-parameter elements and yet exhibit substantially constant electrical characteristics over frequency bands extending to extraordinarily high ranges. In this connection, desired results are promoted by transmission-line circuitry and circuit interconnections, and by associated characteristic-impedance terminations, which maintain substantially ideal matching conditions and render connection line-lengths non-critical.

SUMMARY

In accordance with certain of the aspects of the present invention, it is recognized that although alternate half cycles of local oscillator input to a ring-modulator type of mixer normally should be effectively shunted to ground through different pairs of diodes, this intended mode of operation becomes impaired by the open-circuiting effects of diode-grounding connections when they exhibit critical quarter-wavelength characteristics at high enough frequencies. It is further uniquely recognized that the characteristic impedances evidenced at the ports of hybrid networks afford a means for establishing impedance matches, as well as appropriate power-flow paths, which will enable them to be associated with advantageous transmission-line couplings for all the diode and other paths of such a mixer and at the same time to provide suitable ports for the network. Transmission-line elements of the network which are not otherwise properly terminated inherently through the prescribed circuit connections are at least approximately matched by added loading impedance. An anomalous result is that at least two generally conventional four-port hybrids are employed as components of the improved three-port mixer network, but with remarkable attendant benefit to high-frequency performance.

Accordingly, it is one of the objects of the present invention to provide novel and improved multi-port electrical signal-translating networks in which outstanding performance at exceptionally high frequencies is promoted by transmission-line couplings of non-critical lengths having characteristic-impedance terminations.

Another object is to provide unique ring-modulator type networks of economical practical construction which exhibit high-quality electrical characteristics over unusually broad bands of frequencies.

A further object is to provide efficient low-loss electrical mixers wherein frequency restrictions of quarter-wave cut-off effects are avoided by uniquely associating transmission-line circuit connections with beneficial terminations, and wherein port couplings display characteristic impedances for matching with transmission-line connections for the mixer circuitry.

Still further, it is an object to provide improved three-port mixer equipment in which at least two of the ports are provided by four-port hybrid units connected with a ring diode array via matched transmission-line sections of non-critical lengths, and in which load impedances terminate transmission-line connections to minimize cut-off tendencies.

By way of a summary account of practice of this invention in one of its aspects, the R-F and I-F ports of an electronic mixer network are each provided by the difference port of separate four-port hybrids, and two further ports of each of the like hybids which display opposite-phase characteristics are each electrically connected with a different set of diagonals of a diode ring by way of transmission-line sections having characteristic impedances substantially the same as the associated port impedances. Sum ports of the two hybrids are, in turn, electrically connected with a further unit in the form of a balun or hybrid by way of transmission-line sections having a characteristic impedance substantially the same as the sum port impedances, and load impedance is coupled with the further unit in terminating relation to the sum port lines.

DESCRIPTION OF THE PREFERRED EMBODIMENTS

Figures 1, 2, 3, 4:
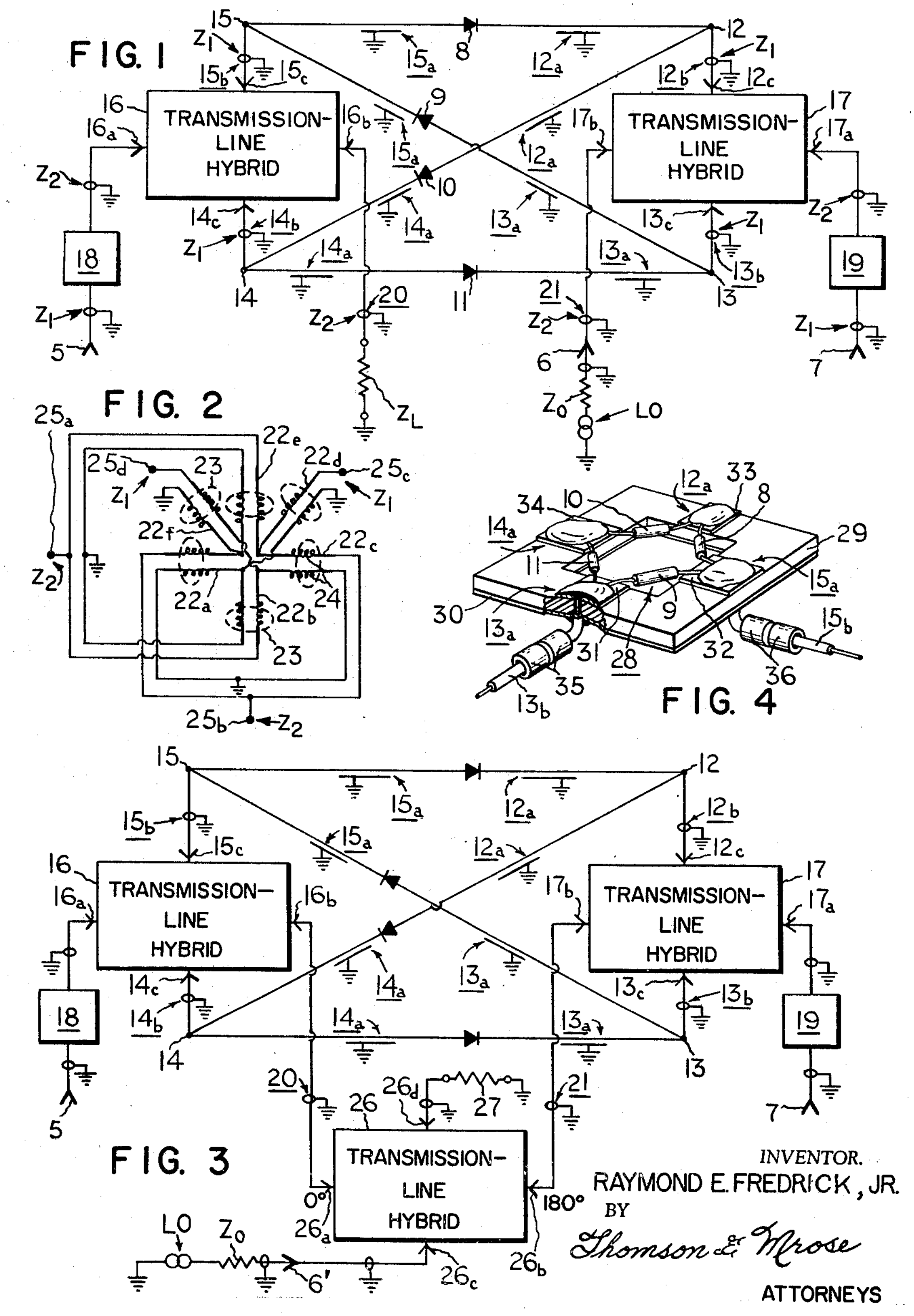
FIGURE 1 is a partly schematic and partly block-diagrammed representation of an improved broadband mixer network.
FIGURE 2 schematically characterizes a four-port hybrid of transmission-line construction suitable for use in the network of FIGURE 1.
FIGURE 3 illustrates a further embodiment of the improved mixer, partly in schematic and block-diagram conventions.
FIGURE 4 depicts a strip-line and beaded coaxial cable connection arrangement for a ring of diodes such as those in the ring-modulator type networks of FIGURES 1 and 3.

The equipment appearing in FIGURE 1 is in the form of a high-frequency mixer assembly wherein three ports, 5–7, are assumed to serve the needs of an R-F input, local oscillator (LO) input, and I-F output, respectively, although the functions may be changed in other instances. In general arrangement, this mixer is like conventional ring-modulators, in that it includes the usual ring array of four diodes 8–11 having the cooperating diagonal junction pairs 12–13 and 14–15. Such arrays normally are intended to operate in the manner of a double-pole double-throw switch, with the alternate half cycles of local oscillator inputs being effective to estabish shunting or short-circuiting to ground of the different R–F power-flow paths through the diode array. However, a critical limiting factor appears from the fact that as the distance from the diodes to ground approaches a quarter wavelength the quarter-wave line section looks like an open circuit to the R–F and the desired shunting will no longer take place, with the obvious result that high-frequency operation is not possible. In avoiding such difficulties, the electrical circuit connections with the diodes 8–11 are established through conductors which are each part of high-frequency transmission lines. As shown, important diode-ring interconnections are conveniently provided by the strip conductors of strip transmission lines $12_a$–$15_a$, the groundplane conductors of which may be part of a common grounded sheet. Connections with the diagonal junctions 12–15 are, in turn, made by transmission lines $12_b$–$15_b$, which are preferably of coaxial-line form and also preferably are loaded by ferrite beads for known purposes. These transmission lines are all selected to exhibit a characteristic impedance $Z_1$, which is of a value corresponding to and thus establishing a proper match with the ports $12_c$–$15_c$ of two four-port hybrids, 16 and 17, which are respectively associated with the R–F port 5 and I–F port 7 of the mixer network. Particularly when these hybrids are themselves of the preferred transmission-line construction, they provide optimum electrical characteristics over a broad frequency range consistent with that intended for the mixer as a whole, and, in addition, are readily matched with the diode-connecting lines. Typically, for example, the impedance $Z_1$ at ports $12_c$–$15_c$ is about 50 ohms, and the aforesaid strip and coaxial lines may conveniently be had with such a characteristic impedance for matching purposes. The ports of hybrids 16 and 17 are assumed to have the usual relationships; considering R.F. unit 16, its input port $16_a$ corresponds to the usual difference port, its port $16_b$ corresponds to the usual sum port, and its two diode-coupled ports $14_c$ and $15_c$ correspond to the usual ports at which signals are of opposite phases. Similarly, in I–F unit 17, the output port $17_a$ corresponds to the usual different ports, its port $17_b$ corresponds to the usual sum port, and the two diode-coupled ports $12_c$ and $13_c$ correspond to the usual ports at which signals are of opposite phases.

The hybrid ports $16_a$–$16_b$ and $17_a$–$17_b$ exhibit impedances $Z_2$ which, according to common practice, are either twice or half the values of $Z_1$, depending upon the choice made. When the value of $Z_2$ at ports 5 and 7 is less desirable than some other, such as $Z_1$, known forms of conversion units such as 18 and 19 may be employed in the network. As is shown, both of the hybrid ports $16_b$ and $17_b$ are connected to ground through load impedances such as $Z_L$ and $Z_O$, which are preferably but not necessarily of the characteristic impedance value, $Z_2$, of these ports and their associated coaxial-cable type transmission lines 20 and 21. Auxiliary load impedance $Z_L$ helps in eliminating the aforementioned quarter-wavelength cut-off problem. Impedance $Z_O$ is typically the internal impedance of the generator LO which is the source of local-oscillator input to mixer port 6. In this mixer, the transmission-line type connections and various matches, by way of the hybrids and otherwise, not only promote solution of the cut-off problem but preserve favorable VSWR characteristics and make possible practical structure in which the various mixer-circuit connections may be of any desired lengths and arranged in any convenient physical relations with other portions of the assembly.

A preferred transmission-line construction for the two hybrids 16 and 17 appears schematically in FIGURE 2, wherein there are six arms $22_a$–$22_f$ of ferrite-beaded coaxial cable interconnected as shown, the beading being designated by dashed linework 23. Transformer effects, symbolized by the winding conventions such as those designated by reference character 24, are developed in accordance with established concepts, and the four hybrid ports $25_a$–$25_d$ exhibit the same functional and impedance characteristics described hereinabove with reference to hybrids 16 and 17. The transmission-line hybrid is thoroughly matched, and its useful frequency range advantageously complements that of the remainder of the illustrated mixer.

The mixer network in FIGURE 3 involves the use of a further hybrid, 26, associated with the local-oscillator port 6′ of a network which is otherwise largely similar to that of FIGURE 1 and which thus has corresponding portions identified by the same reference characters. There, the R–F sum port $16_b$ has applied to it signals which are related to the local oscillator (LO) signals applied to port 6′, this being the result of a matched transmission-line connection 20 between port $16_b$ and a port $26_a$, which is one of two ports, $26_a$ and $26_b$, at which the further hybrid 26 develops out-of-phase signals when the local-oscillator input is applied to its difference port $26_c$. The other port, $26_b$, receives signals related to the local oscillator output, but of opposite phase, and applies this to the sum port $17_b$ of I–F hybrid 17. Sum port $26_d$ of the further hybrid 26 is coupled across a load impedance 27 matched with the port impedance, to preserve hybrid matching. This arrangement, involving oppositely-phased local-oscillator signals supplied to the two hybrids 16 and 17, advantageously results in equal and opposite voltages being applied to the different sides of the diodes, and causes the desired diode conductions while minimizing power losses in the network. Hybrid 26 is preferably of the above-described transmission-line construction, for the same reasons which apply in the cases of hybrids 16 and 17. However, hybrid 26 may also be replaced by a simple balun, also preferably of transmission-line construction, which applies the out-of-phase signals in the prescribed manner.

Ring diode array 28 portrayed pictorially in FIGURE 4 includes the miniature diodes 8–11 of FIGURE 1 in association with a small strip line board 29 of low-loss dielectric material having a conductive ground-plane 30 on one side and, on the other, four separate conductive strips 31–34 to which the diode leads are soldered directly. Resulting strip-line sections $12_a$–$15_a$ are formed with the desired characteristic impedance, and the connecting coaxial lines, such as the illustrated cables $13_b$ and $15_b$ strung with ferrite beads 35 and 36, have their outer conductors soldered to the ground plane 30, and their inner conductors project through the board to positions where they may be soldered to the different strips 31–34.

Those skilled in the art will appreciate that the illustrated components may assume somewhat different forms and that, based upon the recognitions and teachings disclosed herein, one may produce broadband devices of a variety of sizes, for different frequency ranges, and for special-purpose applications which may be specifically different from those discussed. Accordingly, it should be understood that the preferred embodiments and practices disclosed are intended to be of a descriptive rather than a limiting character, and that modifications, combinations and substitutions may be effected in practice of these teachings without departing either in spirit or scope from this invention in its broader aspects.

What I claim as new and desire to secure by Letters Patent of the United States is:

1. Broadband electrical modulation apparatus comprising a diode unit, first means producing periodically-varying electrical signals, second means producing periodically-varying electrical modulation signals, transmission-line means coupling said first means with said diode unit for modulated flow of the electrical signals therefrom through said unit under control of said modulation signals, and transmission-line means coupling said modulation signals from said second means with said diode unit in control of the flow of electrical signals from said first means through said unit, said first and second means having impedances substantially matched with characteristic impedances of the transmission-line means coupled therewith, and load impedance terminating paths of connection by said transmission-line means which are in shunting relation to said diode unit.

2. Broadband electrical mixer apparatus comprising a ring-diode array, means for applying R-F signals to said array, means for applying local-oscillator signals to said array in control of conductions therethrough to develop an I-F output, said first and second means including connections with said array in the form of transmission lines substantially matched with the associated sources of R-F and local-oscillator signals, and load impedance terminating paths of connection by said transmission lines which are in shunting relation to diodes of said array.

3. Broadband electrical apparatus comprising a ring-diode array, first and second four-port hybrids each including a pair of ports at which out-of-phase signals appear in response to signals applied to another port thereof, transmission-line means connecting each said pair of hybrid ports with a different pair of opposite diagonal junctions of said array, means for applying R-F signals to a third port of one of said hybrids, means for applying periodically-varying signals to a third port of the other of said hybrids, load impedance, transmission-line means coupling the fourth port of said one of said hybrids to a ground potential in common with that of the source of said periodically-varying signals through the load impedance as a termination therefor, said last-named transmission-line means having a characteristic impedance substantially the same as the impedance exhibited at said fourth port of said one of said hybrids.

4. Broadband electrical apparatus as set forth in claim 3 wherein said first-named transmission-line means have characteristic impedance substantially the same as the impedance exhibited at the ports of said hybrids to which they are connected, and further comprising coupling means for making electrical connection with the fourth port of said other of said hybrids.

5. Broadband electrical apparatus as set forth in claim 3 wherein said means for applying said periodically-varying signals to said third port of said other of said hybrids further applies signals out of phase with said periodically-varying signals to said fourth port of said one of said hybrids through said last-named transmission-line means.

6. Broadband electrical apparatus as set forth in claim 5 wherein said means for applying said periodically-varying signals to said third port comprises a transmission line having characteristic impedance substantially the same as the impedance exhibited at said third port of said other of said hybrids.

7. Broadband electrical apparatus as set forth in claim 6 wherein the load impedance comprises substantially the internal impedance of the source of said periodically-varying signals.

8. Broadband electrical apparatus as set forth in claim 6 wherein each of said transmission-line means and said transmission line comprises ferrite-loaded coaxial cable means, and wherein each of said hybrids is formed by ferrite-loaded transmission lines.

9. Broadband electrical apparatus as set forth in claim 6 wherein said means for applying said periodically-varying and out-of-phase signals comprises a third four-port hybrid having a pair of ports at which out-of-phase signals appear in response to periodically-varying signals applied to a third port thereof, said pair of ports of said third hybrid being respectively connected with said fourth port of said one of said hybrids and with said third port of said other of said hybrids through said transmission-line means and said transmission-line respectively.

10. Broadband electrical apparatus as set forth in claim 9 further comprising load impedance terminating the fourth port of said third hybrid in substantially the characteristic impedance of said fourth port of said third hybrid.

11. Broadband electrical apparatus as set forth in claim 5 comprising a mixer wherein said fourth port of said one of said hybrids and said third port of said other of said hybrids are sum ports, wherein said third port of said one of said hybrids is a difference port, wherein said periodically-varying signals are local-oscillator signals, and wherein the fourth port of said other of said hybrids develops I-F output signals from the mixer.

12. Broadband electrical apparatus as set forth in claim 10 comprising a mixer wherein said fourth ports of said one and said third hybrids and said third port of said other of said hybrids are sum ports, wherein said third ports of said one and said third hybrids and the fourth port of said other of said hybrids are difference ports, wherein said periodically-varying signals are local-oscillator signals, and wherein said fourth port of said other of said hybrids develops I-F output signals from the mixer.

13. Broadband electrical apparatus as set forth in claim 8 wherein said transmission-line means connecting each of said pair of hybrid ports with a different pair of opposite diagonal junctions of said ring-diode array comprises ferrite-loaded coaxial cables, and further comprising strip transmission line including a plurality of strip conductors electrically connecting the diodes of said array with center conductions of said cables, and a ground-plane conductor common to all of said strip conductors and separated therefrom by dielectric material and electrically connected with the outer conductors of said cables.

References Cited

UNITED STATES PATENTS

| | | | |
|---|---|---|---|
| 2,441,598 | 5/1948 | Robertson | 332—44 X |
| 3,029,396 | 4/1962 | Sichak | 333—11 X |
| 3,233,194 | 2/1966 | Alford | 333—11 X |
| 3,241,071 | 3/1966 | Alford | 333—11 X |
| 3,349,342 | 10/1967 | Garver | 325—445 |

ALFRED L. BRODY, Primary Examiner

U.S. Cl. X.R.

325—445; 332—44; 333—11